June 23, 1970   F. B. JONES   3,516,468
BREAKER STRIP FOR PNEUMATIC TIRES
Filed May 28, 1968

Inventor
Frank B. Jones

Stevens, Davis, Miller & Mosher
Attorneys

United States Patent Office 3,516,468
Patented June 23, 1970

3,516,468
BREAKER STRIP FOR PNEUMATIC TIRES
Frank B. Jones, Birmingham, England, assignor to The Dunlop Company Limited, London, England, a British company
Filed May 28, 1968, Ser. No. 732,616
Claims priority, application Great Britain, June 16, 1967, 27,765/67
Int. Cl. B60c 9/20
U.S. Cl. 152—361      5 Claims

ABSTRACT OF THE DISCLOSURE

A pneumatic tire provided with a breaker assembly such that self-aligning torque in the complete tire is substantially eliminated, the breaker assembly comprising an even number of breaker layers greater than two arranged such that the cord angles of the layers in the radially outer half of the breaker assembly are mirror imaged by those of the radially inner half and such that at least two adjacent layers in each of said halves are disposed in opposite sense with respect to the mid-circumferential plane of the tire while the cord angles of the central pair of layers are disposed in the same sense.

---

Figure 1:
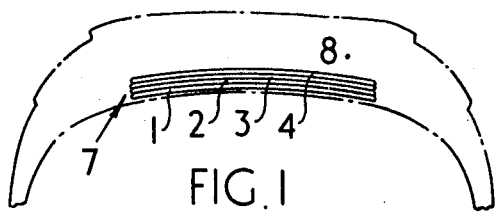

This invention relates to a radial ply pneumatic tire construction incorporating a plurality of breaker layers located in between the tread portion of a tire and the radially outermost carcass ply thereof. The term "radial ply pneumatic tire" as used herein and throughout this specification will be understood to refer to a tire having a carcass comprising one or more carcass plies of rubberised parallel cord material wherein the angle of the cords to the mid-circumferential plane of the tire is equal or substantially equal to 90°.

In known constructions of such radial ply pneumatic tires four breaker layers have been provided in which the cord angles in each layer are substantially equal and are of the order of, for example, 20° but the angles in all of the adjacent layers one to another are in the opposite sense with respect to the mid-circumferential plane of the tire. If the cornering force and self-aligning torque of such a tire is measured, it is found that, when the tire is loaded and running vertically exactly in a straight line, a side-force is developed acting on the tire. This side-force, or its equivalent cornering force and self-aligning torque, is of such magnitude to be equivalent to steering the tire from the straight ahead position through an angle of between a ¼° and ½°, and it is an object of the present invention to provide a radial ply pneumatic tire construction wherein the above-mentioned disadvantage is eliminated or substantially reduced.

According to the invention there is provided a radial ply pneumatic tire having a breaker assembly comprising four or any even number greater than four breaker layers or rubberised parallel cord material wherein the cord angles of the layers in the radially outer half of the breaker assembly with respect to the mid-circumferential plane of the tire are substantially mirror imaged in the radially inner half of the breaker assembly about the plane disposed midway between the central pair of breaker layers, the cord angles of at least two adjacent layers in each of said halves of the breaker are in an opposite sense with respect to said plane of the tire while the cord angles of the central pair of layers is in the same sense with respect to the said plane.

All of the breaker layers may be of substantially equal width and the cord angles of the layers to the mid-circumferential plane of the tire may lie within the range 10° to 45°. For example, in a four layer breaker construction the range of cord angles to the mid-circumferential plane of the tire may be from 10° to 30° and in such a construction wherein the cord angles of the centre layers of the breaker are in the same sense with respect to the mid-circumferential plane of the tire it is preferable that such angles should differ by approximately 5° to prevent the set of cords of one layer from moving randomly between cords of the other layer.

For the sake of clarity in this specification cord angles of the breaker layers which lie in opposite senses with respect to the mid-circumferential plane of the tire will be denoted by positive and negative signs so that, for example, in a six breaker layer construction in accordance with the invention the signs of the cord angles in one embodiment may be denoted by +, —, +, +, —, + although the actual numerical values of the cord angles may be slightly different as is described in the preceding paragraph.

Figure 1A:
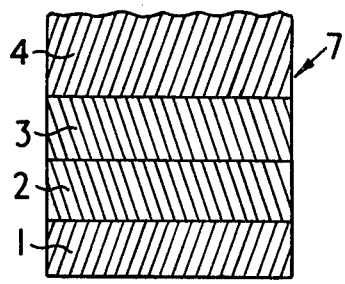
Figure 3:
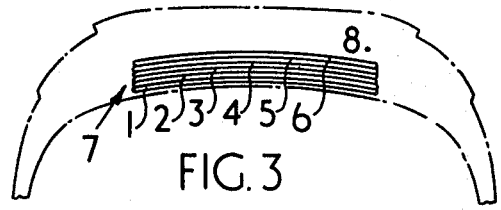
Figure 2:
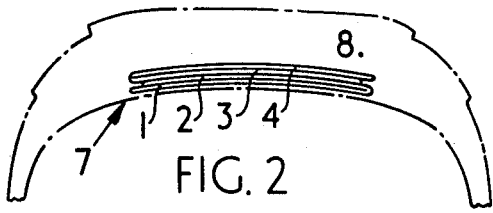
Figure 2A:
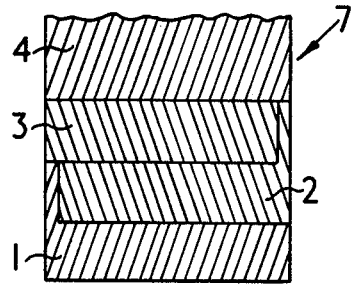
Figure 3A:
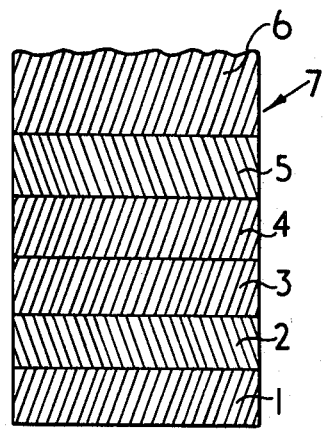

Embodiments of radial ply pneumatic tires constructed in accordance with the invention will now be described with reference to the accompanying drawings wherein:

FIG. 1 illustrates a radial ply pneumatic tire in axial cross-section having four breaker layers according to a first embodiment of the invention, FIG. 1A is a plan view of the breaker assembly shown in FIG. 1 illustrating the disposition of the breaker layers, FIG. 2 illustrates a radial ply pneumatic tire in axial cross-section having four breaker layers, the radially inner and radially outer pairs of which are formed by folding breaker layer material, according to a second embodiment of the invention, FIG. 2A is a plan view of the breaker assembly shown in FIG. 2 illustrating the disposition of the breaker layers, FIG. 3 illustrates a radial ply pneumatic tire in axial cross-section having six breaker layers according to a third embodiment of the invention, FIG. 3A is a plan view of the breaker assembly shown in FIG. 3 illustrating the disposition of the breaker layers.

In a first embodiment of the invention a radial ply pneumatic tire comprises two carcass plies (not shown) of rubberised parallel textile cord material wherein the angles of the cords in each ply are at an angle of 90° to the mid-circumferential plane of the tire. A breaker 7 located radially outwardly of the radially outermost carcass ply and beneath the tread 8 comprises four breaker layers 1, 2, 3 and 4, the cord angles of each layer lying at substantially 20° to the mid-circumferential plane of the tire but the senses of such angles reading from the radially outermost layer 4 to the radially innermost layer 1 are +, —, —, +. In this construction all four of the breaker layers are of substantially equal width.

In a modification of the first embodiment the two centre breaker layers 2 and 3 whose angles are in the same sense with respect to the mid-circumferential plane differ by some 5° from one another.

According to a second embodiment of the invention a radial ply pneumatic tire comprises a carcass as described in a first embdiment of the invention, and a four layer breaker the radially outer pair 3 and 4 and the radially inner pair 1 and 2 of layers of which are each formed by folding breaker layer material the senses of the cord angles with respect to the mid-circumferential plane of the tire in the assembled breaker are again +, —, —, + as described above.

In either of the above embodiments the cord angles are located within the range from 10° to 25°.

According to a third embodiment of the invention a radial ply pneumatic tire comprises a carcass as described in a first embodiment of the invention and a six layer breaker wherein the senses of the cord angles in the layers 1, 2, 3, 4, 5 and 6 thereof reading from the radially outermost to the radially innermost layer are +, —, +, +, —, + and according to this embodiment the cord angles of the radially outermost and innermost layers 6 and 1 respectively lie within the range 10° to 45° and those of the four centrally disposed layers within the range 10° to 30°.

In breaker constructions hitherto known, for example, in a four layer breaker construction wherein the senses of the cord angles have been +, —, +, — it has been found that upon deflection of the breaker in the contact area of the tire upon the ground there is caused a slight rotation of the cords in that area, and the above arrangements of the senses of the cord angles give rise to the development of a cornering force and self-aligning torque—which can be equivalent to the steering of the tire through an angle of between ¼° and ½°. However, a breaker constructed in accordance with the present invention may not develop either a cornering force or a self-aligning torque because, for example, in a four layer construction wherein the senses of the cord angles with respect to the mid-circumferential plane of the tire are + — — + or — + + — it is found that the effect of the rotation of the cords in the contact area substantially cancels out between the four layers.

Having now described my invention, what I claim is:

1. A radial ply pneumatic tire having a breaker assembly comprising at least two pairs of breaker layers of rubberised parallel cord material wherein the cord angles of the layers in the radially outer half of the said breaker assembly with respect to the mid-circumferential plane of the tire are substantially mirror imaged in the radially inner half of the breaker assembly about the plane disposed midway between the central pair of breaker layers, the cord angles of at least two adjacent layers in each of said halves of the breaker are in an opposite sense with respect to said plane of the tire while the cord angles of the central pair of layers are in the same sense with respect to the said plane.

2. A radial ply pneumatic tire according to claim 1 wherein all of the breaker layers are of substantially the same width.

3. A radial ply pneumatic tire according to claim 1 wherein the cord angle of the breaker layers with respect to the mid-circumferential plane of the tire lies within the range 10° to 45°.

4. A radial ply pneumatic tire according to claim 1 wherein the cord angles of the centre pair of breaker layers which are in the same sense with respect to the mid-circumferential plane of the tire differ by approximately 5°.

5. A radial ply pneumatic tire according to claim 1 wherein the radially outer and radially inner pair of layers are each formed by folding breaker layer material.

References Cited

UNITED STATES PATENTS 2,225,042  12/1940  Elliott _____ 152—361
3,438,827  4/1969   Bush _____ 152—361

ARTHUR L. LA POINT, Primary Examiner

C. B. LYON, Assistant Examiner